US012676527B2

(12) United States Patent
Lang et al.

(10) Patent No.: US 12,676,527 B2
(45) Date of Patent: Jul. 7, 2026

(54) ROTOR FOR AN ELECTRIC MACHINE, METHOD FOR PRODUCING A ROTOR, AND ELECTRIC MACHINE FOR A MOTOR VEHICLE

(71) Applicant: Bayerische Motoren Werke Aktiengesellschaft, Munich (DE)

(72) Inventors: Markus Lang, Munich (DE); Jerome Ragot, Munich (DE); Robert Schmidt, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 255 days.

(21) Appl. No.: 18/689,229

(22) PCT Filed: Aug. 31, 2022

(86) PCT No.: PCT/EP2022/074205
§ 371 (c)(1),
(2) Date: Mar. 5, 2024

(87) PCT Pub. No.: WO2023/046429
PCT Pub. Date: Mar. 30, 2023

(65) Prior Publication Data
US 2024/0372429 A1 Nov. 7, 2024

(30) Foreign Application Priority Data

Sep. 21, 2021 (DE) ..................... 10 2021 124 317.3

(51) Int. Cl.
| | |
|---|---|
| *H02K 3/52* | (2006.01) |
| *H02K 1/24* | (2006.01) |
| *H02K 15/066* | (2025.01) |

(52) U.S. Cl.
CPC ............... *H02K 3/527* (2013.01); *H02K 1/24* (2013.01); *H02K 15/066* (2013.01)

(58) Field of Classification Search
CPC ........ H02K 1/24; H02K 15/066; H02K 3/527; H02K 1/04
See application file for complete search history.

(56) References Cited

U.S. PATENT DOCUMENTS

| | | |
|---|---|---|
| 2003/0193256 A1 | 10/2003 | Liebermann |
| 2016/0211712 A1* | 7/2016 | Patel ......................... H02K 3/30 |

(Continued)

FOREIGN PATENT DOCUMENTS

| | | |
|---|---|---|
| DE | 10 2013 200 476 A1 | 2/2014 |
| DE | 10 2018 213 567 B3 | 12/2019 |

(Continued)

OTHER PUBLICATIONS

KR-102046539-B1 machine translation Dec. 27, 2025.*

(Continued)

*Primary Examiner* — Leda T Pham
(74) *Attorney, Agent, or Firm* — Crowell & Moring LLP

(57) ABSTRACT

A rotor for an electric machine includes a rotor main part which has at least one pole core, at least one winding device which is received on the at least one pole core, and at least one contact device which is rotationally fixed to the rotor main part and which is coupled to the at least one winding device to conduct a current. The at least one winding device includes at least one winding that is plugged onto the at least one pole core and has two winding wire ends, at least one winding wire end of which is coupled to the at least one contact device to conduct a current via at least one plug connection.

10 Claims, 4 Drawing Sheets

(56) References Cited

U.S. PATENT DOCUMENTS

| | | |
|---|---|---|
| 2018/0166936 A1 | 6/2018 | Do et al. |
| 2019/0020233 A1* | 1/2019 | Schmidt ................. H02K 19/02 |
| 2020/0083776 A1* | 3/2020 | Patel ........................ H02K 3/51 |
| 2020/0313488 A1 | 10/2020 | Coldwate et al. |
| 2021/0006105 A1 | 1/2021 | Feustel et al. |
| 2021/0226502 A1 | 7/2021 | Larson et al. |

FOREIGN PATENT DOCUMENTS

| | | | |
|---|---|---|---|
| EP | 1 724 904 A2 | 11/2006 | |
| KR | 102046539 B1 * | 11/2019 | .............. H02K 1/04 |
| WO | WO 03/019748 A1 | 3/2003 | |

OTHER PUBLICATIONS

International Search Report (PCT/ISA/210) issued in PCT Application No. PCT/EP2022/074205 dated Jan. 3, 2023 with English translation (5 pages).
German-language Written Opinion (PCT/ISA/237) issued in PCT Application No. PCT/EP2022/074205 dated Jan. 3, 2023 with English translation (9 pages).
German-language Search Report issued in German Application No. 10 2021 124 317.3 dated Jul. 15, 2022 with partial English translation (13 pages).

* cited by examiner

ROTOR FOR AN ELECTRIC MACHINE, METHOD FOR PRODUCING A ROTOR, AND ELECTRIC MACHINE FOR A MOTOR VEHICLE

BACKGROUND AND SUMMARY

The invention relates to a rotor for an electric machine. Other aspects of the invention relate to a method for producing a rotor and an electric machine with a rotor.

In order to simplify the production of electric machines in large numbers, various approaches are known from the prior art. For example, DE 10 2013 200 476 A1 discloses a permanent magnet synchronous machine with a stator having a winding system positioned in grooves, a rotor with permanent magnets, which interacts electromagnetically with a magnetic field generated by the winding system of the stator during the operation of the permanent-magnet synchronous machine between the stator and the rotor in such a way that the rotor rotates around an axis of rotation in a direction of rotation, and with pockets running axially in or on the rotor. One pocket has at least two permanent magnets with differently oriented magnetization directions, so that two or more magnetic poles of the rotor are formed.

The object of the present invention is to develop a low cost of production and highly fail-safe rotor for an electric machine, a method for low-cost production of a fail-safe rotor and an electric machine with such a rotor.

This object is achieved by a rotor, by a method, and by an electric machine with the features of the claimed invention.

A first aspect of the invention relates to a rotor for an electric machine, having a rotor base body which has at least one pole core, with at least one winding device which is mounted on the at least one pole core and with at least one contact device which is non-rotatably connected to the rotor base body and conductively coupled to the at least one winding device. The electric machine can be in the form of an electric motor and can also be operated as a generator. In addition, the electric machine can have a stator, which can be coupled to a housing of the electric machine or can be in the form of a housing of the electric machine. In particular, the rotor can be of a current-excited form. In other words, the rotor can be in the form in particular of an SSM rotor, i.e., as a rotor in the form of an armature of an electric machine in the form of a current-excited synchronous machine.

According to embodiments of the invention, it is provided that the at least one winding device contains at least one winding which is attached to the at least one pole core and has two winding wire ends, of which at least one winding wire end is conductively connected to the at least one contact device by way of at least one plug-in connection. This is advantageous, as by attaching the winding device an elaborate wrapping of the pole core to produce the winding device on the pole core can be dispensed with, which makes it easier and more precise to produce. In addition, due to the conductive coupling of the winding wire via the plug-in connection to the contact device, contacting the winding device, for example with a switching ring of the rotor, can be dispensed with, which improves the failure safety of the rotor. The invention is based on the knowledge that wire cracks can occur on such a switching ring over the service life of the rotor, which can lead to a failure of the rotor.

The winding can generally be made of a winding wire. The winding wire can contain a metal wire and an insulation sheath that electrically insulates the metal wire. The insulation sheath can preferably be in the form of a lacquer layer, which means that particularly little installation space is taken up by the insulation. The metal wire can preferably be made of copper or a copper alloy, so the winding can also be referred to as a copper winding.

Preferably, the at least one winding wire end can be oriented in an attachment direction in which the winding device can be attached to the pole core during the production of the rotor. Thus, at least one winding wire end, preferably both winding wire ends, can be oriented parallel or at least essentially parallel to a radial extent direction of the rotor. This makes it possible to attach the winding device to the pole cores and to form the plug-in connection for the conductive coupling of the winding wire end to the contact device with a temporal overlap, i.e., at least partially simultaneously. For example, shortly before the winding device reaches its end position during attachment to the pole cores, the plug-in connection and thus the conductive connection can also be established by coupling the respective winding wire end to the contact device.

In an advantageous development of the invention, the at least one winding is in the form of a prefabricated winding. This simplifies the production of the rotor particularly effectively. During the production of the rotor, the prefabricated winding of the winding device can be attached over the pole core from the outside, especially in the radial extent direction of the rotor. Each pole core of the rotor can have its own prefabricated winding device, which can also be referred to as a winding package. Each winding package can have the two winding wire ends as respective contact points. When attaching the respective winding device to the respective pole cores, the respective plug-in connection can allow a respective current flow between the winding devices and the contact device of the rotor.

In a further advantageous development of the invention, the at least one winding device has at least one alignment element which keeps at least one of the winding wire ends oriented in a predetermined orientation. This simplifies the mounting of the winding device on the pole core during the establishment of the plug-in connection by holding at least one end of the winding wire in the predetermined orientation, in particular aligned with the contact device, by way of the alignment element. The orientation can preferably be oriented parallel to the radial extent direction of the rotor. In general, the winding device can contain the winding on the one hand and the alignment element on the other, i.e., at least two components.

In a further advantageous development of the invention, the at least one alignment element has at least one through opening, through which the at least one winding wire end is passed and kept oriented in the orientation. This is advantageous, as the winding wire end can be supported by way of the alignment element to prevent any unwanted kinking during assembly.

In a further advantageous development of the invention, the at least one winding wire end is joined to the at least one alignment element. As a result, particularly reliable assembly can be ensured, as joining can achieve an improved connection between the alignment element and the winding wire end. Jointing can be achieved by way of a bonded connection between the winding wire end and the alignment element, i.e., by gluing, for example. In addition, or alternatively, the winding wire end can be connected to the alignment element by force locking, for example by pinching the winding wire end in the through opening. A form-fitting connection is also conceivable.

In a further advantageous development of the invention, the contact device contains at least one spring element, by way of which the at least one winding wire end is coupled to the contact device to establish the plug-in connection. This is advantageous, as it enables a reversible and thus non-destructive detachment of the winding wire end from the contact device. This can, for example, make it easier to replace the winding device.

In a further advantageous development of the invention, the rotor contains at least one pole shoe, which is connected to the at least one pole core and prevents a centrifugal force detachment of the at least one winding device from the at least one pole core while the rotor is being used as intended. This is advantageous because the pole shoe allows a large area of support of the winding device on the pole shoe when centrifugal forces in particular force the winding device outwards in the direction of radial extent while the electric machine is being used as intended, especially when the rotor is rotating. In particular, the at least one pole shoe can be connected to the at least one pole core so as to be reversibly detachable, i.e., non-destructively detachable. When the rotor is used as intended, the rotor rotates around an axis of rotation and relative to a stator of the electric machine. The axis of rotation can be oriented along an axial extent direction of the rotor which is also referred to as the longitudinal extent direction.

A second aspect of the invention relates to a method of producing a rotor in accordance with the first aspect of the invention, including at least the following steps:

a) Attaching the at least one winding device to the at least one pole core;

b) Coupling the at least one winding of the at least one winding device to the at least one contact device by coupling the at least one winding wire end to the at least one contact device by way of the at least one plug-in connection.

By this method, the rotor can be provided in a simple and fail-safe manner.

In an advantageous development of the invention, the coupling is carried out in accordance with step b) during, in particular as a result of, the attachment in accordance with step (a). This can save time for the production of the rotor in an advantageous way. In other words, by carrying out step a), step b) can be carried out. With the completion of step (a), step (b) is thus also completed.

A third aspect of the invention relates to an electric machine for a motor vehicle, with at least one rotor according to the first aspect of the invention. Such an electric machine is easy to produce and particularly fail-safe to operate. The electric machine can preferably be in the form of a traction machine of the motor vehicle, i.e., it can drive the motor vehicle.

The preferred exemplary embodiments presented in relation to one of the aspects and the advantages thereof apply correspondingly to the other aspects of the invention and vice-versa.

The features and combinations of features mentioned above in the description, as well as the features and the combinations of features mentioned below in the description of the figures and/or shown in the figures alone, are not only able to be used in the respective combination but can also be used in other combinations or on their own, without departing from the scope of the invention.

Further advantages, features and details of the invention can be found in the claims, the following description of preferred embodiments, and based on the drawings.

In the following, the invention is explained once again on the basis of a specific exemplary embodiment.

DETAILED DESCRIPTION OF THE DRAWINGS

Figure 1:
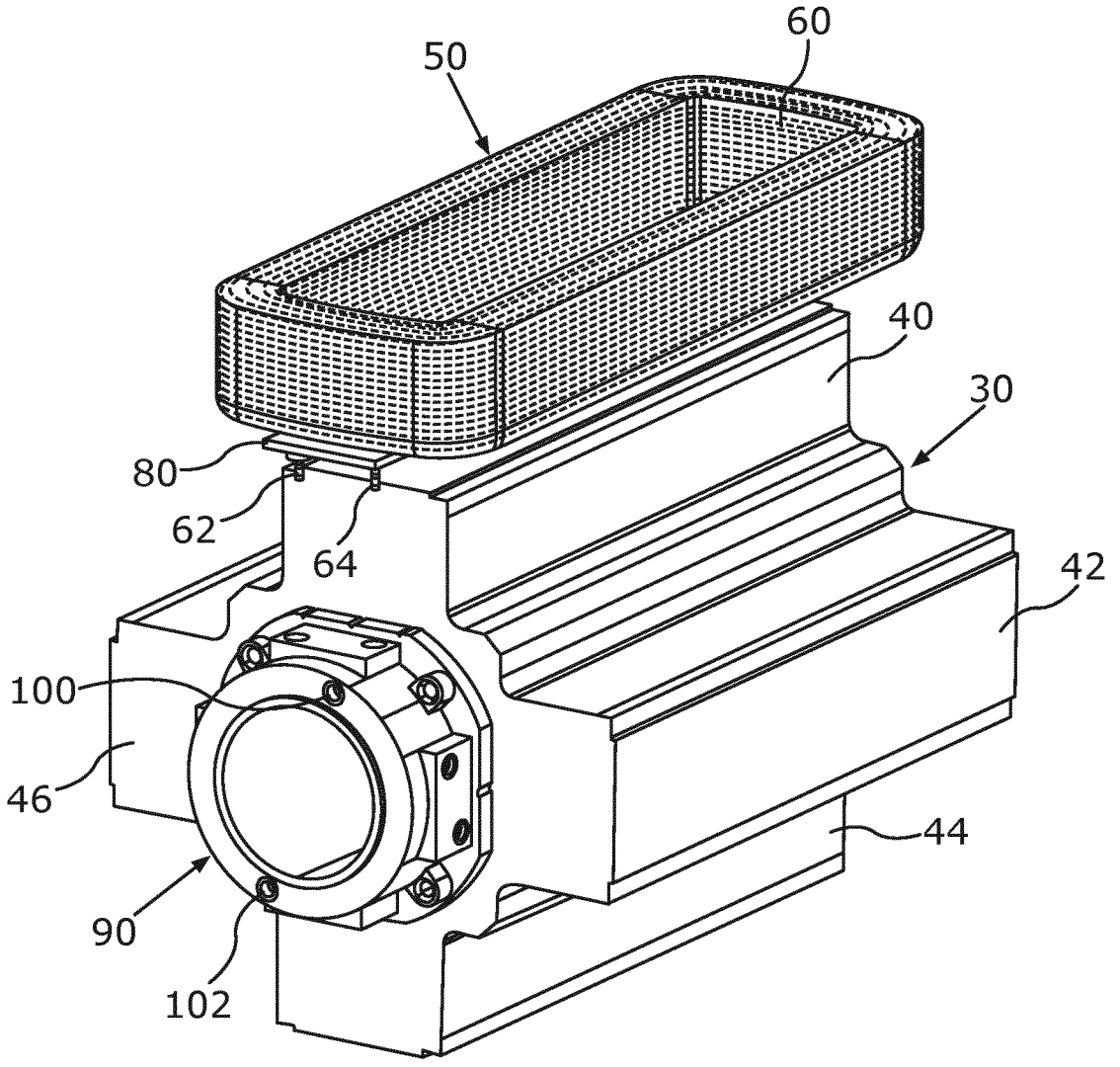
FIG. 1 shows a schematic perspective view of a rotor base body of a rotor for an electric machine, wherein the rotor base body has four rotor cores regularly arranged in the circumferential direction of the rotor and a prefabricated winding device is attached to one of the rotor cores.
Figure 5:
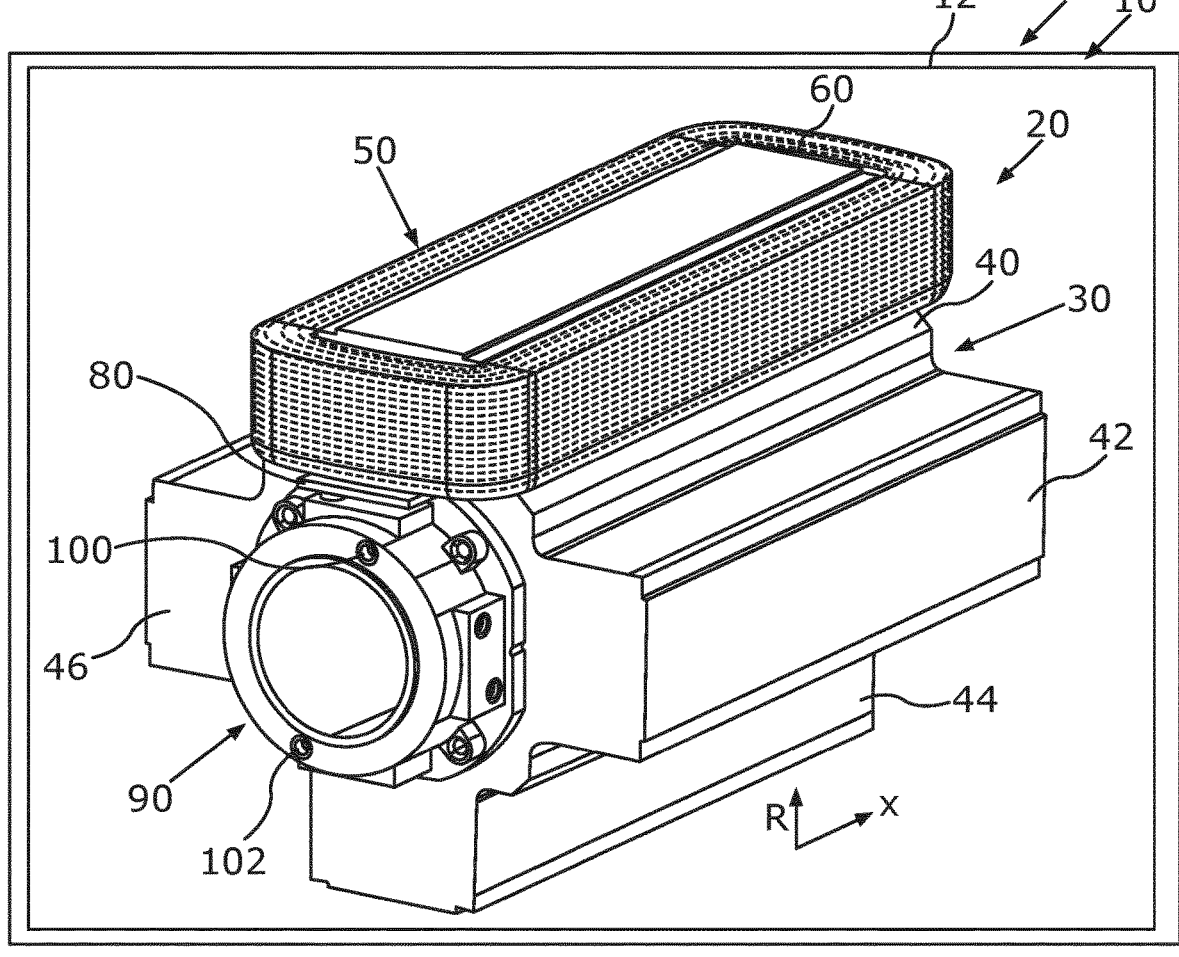
FIG. 5 shows a schematic perspective view of the rotor base body to which one of the prefabricated winding devices is joined.

FIG. 1 shows a schematic perspective view of a rotor base body 30 of a rotor 20 for an electric machine 10 shown abstracted in FIG. 5. The electric machine 10 contains a stator 12, which can also be used as the housing of the electric machine 10 and is designed as a traction machine of a motor vehicle K, which is also illustrated in a highly abstracted manner. Thus, the electric machine 10 serves to drive, i.e., to move, the motor vehicle K.

In the case of a method for the production of the rotor 20, in a first step (a) respective winding devices 50 of the rotor 20 are attached to respective pole cores 40, 42, 44, 46 of the rotor base body 30. In the present case, the rotor 20 contains the four pole cores 40, 42, 44, 46, which are arranged in the circumferential direction of the rotor 20 at 90° intervals from each other and distributed over the rotor base body 30. As a result, for example, the pole cores 40 and 44 include an angle of 180° with each other, as do the pole cores 42 and 46.

Figure 6:
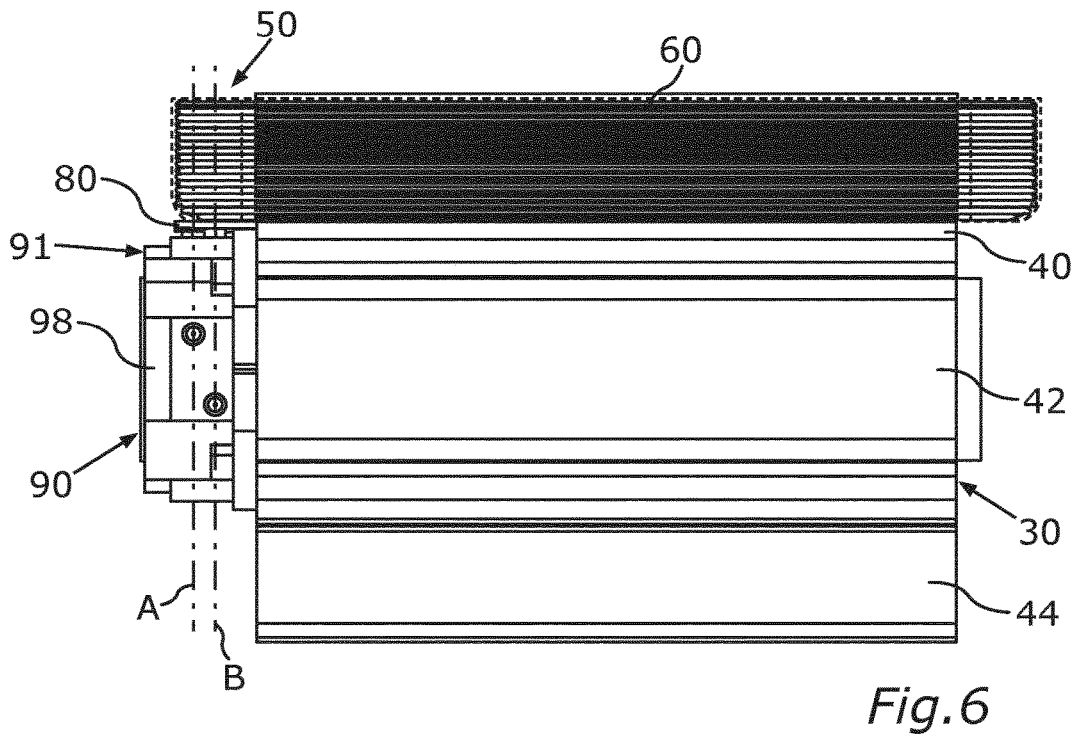
FIG. 6 shows a schematic side view of the rotor base body shown in FIG. 5 with the winding device, wherein two parallel sectional planes A and B pass through the contact device.

In FIG. 1, FIG. 5 and FIG. 6 for clarity only one of the total of four winding devices 50 is shown, which is attached to the pole core 40 according to step a) of the method. The attachment of the remaining three winding devices 50 to the remaining pole cores 42, 44, 46 carried out for the completion of the rotor 20, is not shown. However, the following remarks on the individual winding device 50 apply to all winding devices 50.

The rotor 20 also contains a contact device 90, which is non-rotatably connected, for example screwed, to the rotor base body 30 and is conductively coupled to the respective winding devices 50. The contact device 90 can preferably be in the form of a ring body, as can be seen, for example, in FIG. 1. For the at least indirect transfer of electrical energy from an energy storage device, here not shown further, of the motor vehicle K via power electronics, also not shown further, of the motor vehicle K to the winding devices 50, respective contacts 100, 102 of the contact device 90 can be arranged on an end face 91 of a contact ring element 98 of the contact device 90. The contacts 100, 102 can extend in an axial extent direction x, depicted in FIG. 6 by an arrow, of the rotor 20 in the direction of the rotor base body 30, as can be seen from an overall view of FIG. 1, FIG. 5 and FIG. 6. The contacts 100, 102 can each contain a recess into which plug elements not shown here can be plugged to establish the conductive connection between the energy storage device or power electronics and winding devices 50. A sliding contact, which is not shown in detail here, can be made by way of the connector elements and can be used to maintain the conductive connection when the rotor is rotating 20.

Figure 4:
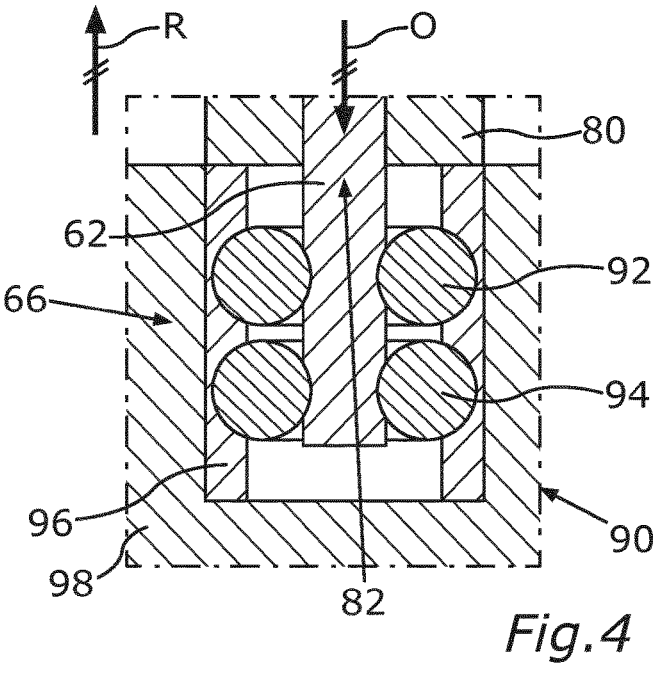
FIG. 4 shows an enlarged sectional representation of the connection between the contact device and one of the winding wire ends.

Each of the winding devices 50 contains at least one prefabricated winding 60, which is attached to the respective pole cores 40, 42, 44, 46 in the prefabricated rotor 20. Each winding contains two winding wire ends 62, 64, each conductively coupled to the contact device 90 via plug-in connections 66, 68. The winding wire ends 62, 64 are each joined to the contact device 90 in an attachment direction and with an orientation O indicated by an arrow. The orientation O as well as the attachment direction are at least essentially parallel to a radial extent direction R of the rotor 20 and of the rotor base body 30 indicated by a further arrow in FIG. 4 and FIG. 5 and relative to the respective pole cores 40, 42, 44, 46, as shown in FIG. 4 in the enlarged representation of the plug-in connection 66 between the first winding wire end 62 and the contact device 90 relating to the pole core 40. The expression "essentially parallel" can be understood to mean that the orientation O and the radial extent direction R include an angle of less than 10°, preferably less than 5°. In order to compensate for manufacturing tolerances, the respective winding wire ends 62, 64 can also be elastically deformed, in particular elastically bent in some areas, during the formation of the respective plug-in connection 66, 68.

The plug-in connections 66, 68 can be established in a further step (b) of the method, in which the coupling of the winding device 50 to the contact device 90 is carried out by coupling both winding wire ends 62, 64 of the winding 60 to the contact device 90 via the respective plug-in connection 66, 68 in the present case. The respective winding wire ends 62, 64, at least in some areas, are free of an insulation sheath enclosing a metal wire of a winding wire of the respective winding 60 for electrical insulation in a region of the winding wire different from the winding wire ends 62, 64.

Figure 2:
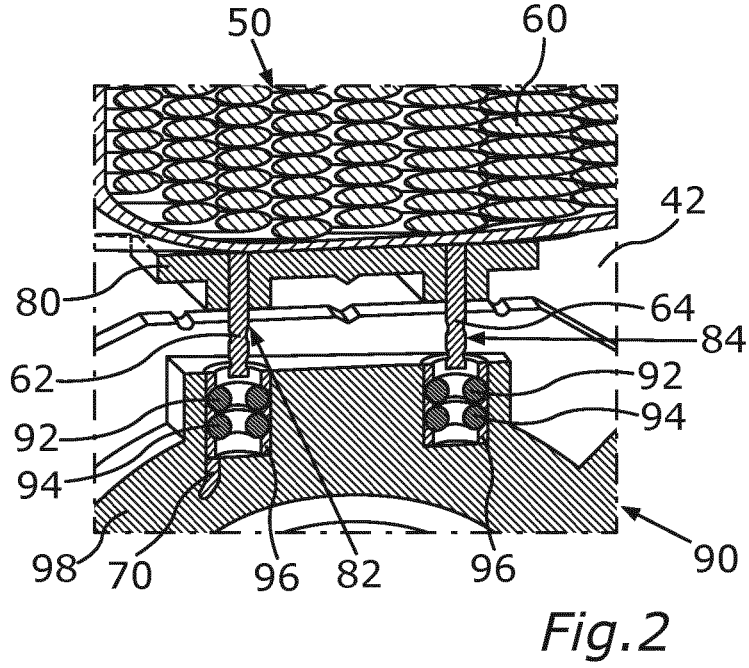
FIG. 2 shows an enlarged detailed representation of an obliquely sectioned part of a contact device of the rotor, to which two winding wire ends of the winding device are fed when they are attached in order to establish a respective plug-in connection for conductive contacting between the contact device and the winding wire ends.
Figure 3:
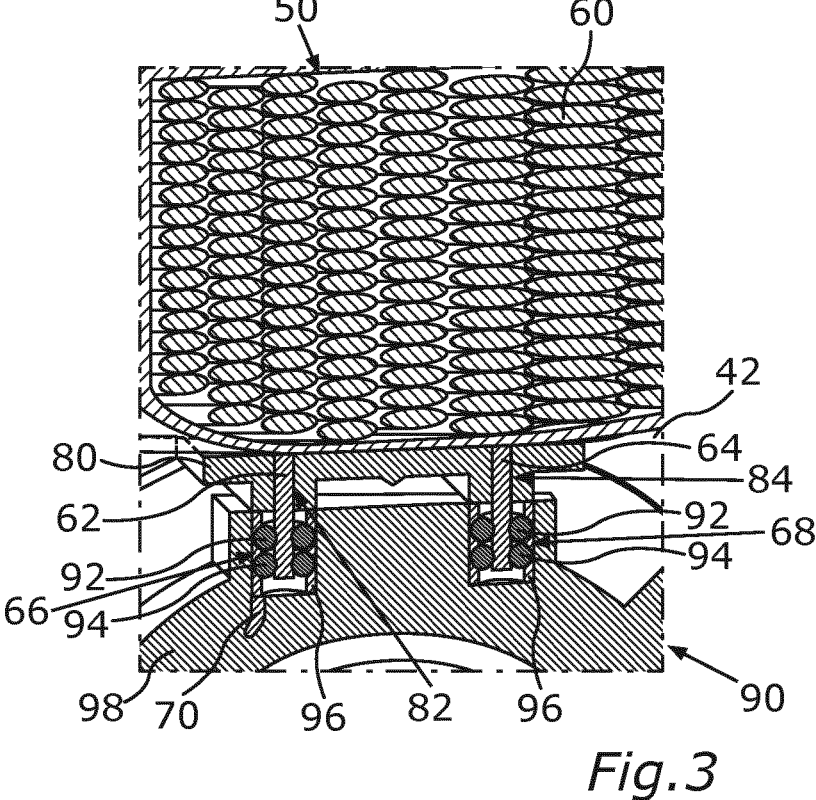
FIG. 3 shows a further enlarged detailed representation of the obliquely sectioned part of the contact device, which shows the established plug-in connection between the contact device and the winding wire ends.

The coupling according to step b) takes place during and as a result of the attachment according to step a), which saves one assembly step, namely the separate performance of steps a) and b) in succession. Step (b) of this method is illustrated by an overall view of FIG. 2 and FIG. 3. It should be noted that FIG. 2 and FIG. 3 each show sectional representations according to an oblique sectional plane that intersects both a sectional plane A and a sectional plane B in FIG. 6. In other words, this oblique sectional plane is not perpendicular to the axial extent direction x. The section representation according to the oblique sectional plane is used to show both plug-in connections 66, 68 sectioned together, especially since the plug-in connections 66, 68 are offset relative to each other in the axial extent direction x, as will be explained below.

To keep the winding wire ends 62, 64 oriented in the predetermined orientation O during assembly, each winding device 50 has at least one alignment element 80. The respective alignment element 80 has a through opening 82, 84 for each of the winding wire ends 62, 64, through which the respective winding wire end 62, 64 is passed and kept oriented in the orientation O. Each of the winding wire ends 62, 64 can be joined to the corresponding alignment element 80, for example glued in the position thereof inserted into the through opening 82, 84.

On the basis of FIG. 4 it can be seen that the contact device 90 contains two spring elements 92, 94 for each plug-in connection 66, 68, which are arranged one behind the other in the orientation O. As a result, the spring element through openings of the spring elements 92, 94, which are arranged one behind the other in the orientation O and thus in the attachment direction, align. If, for example, one of the winding wire ends 62, 64 is joined to the contact device 90 in the attachment direction during the formation of the respective plug-in connection 66, 68, the respective winding wire end 62, 64 is contacted with the respective spring elements 92, 94 by inserting the corresponding winding wire end 62, 64 into the respective spring element through opening of the respective spring element 92, 94 and is thereby conductively connected, for example tightly, to the respective spring element 92, 94. The spring elements 92, 94 are accommodated in a respective sheath element 96 for each plug-in connection 66, 68, preferably crimped and connected to the contact ring element 98 of the contact device together with the respective sheath element 96. The contact device 90 can be connected, preferably screwed, to the rotor base body 30 on the contact ring element 98. The contact device 90 therefore contains at least the contact ring element 98, on which the contacts 100, 102 are also arranged, as well as one of the sheath elements 96 and two of the spring elements 92, 94 for each plug-in connection 66, 68.

The respective pole shoes of the rotor 20 are not shown in FIG. 1 to FIG. 8. In each case, one of the pole shoes may be connected to at least one of the pole cores 40, 42, 44, 46 and a centrifugal force detachment of the respective winding device 50 from the respective pole core 40, 42, 44, 46 is prevented while the rotor is being used as intended 20.

Figures 7, 8:
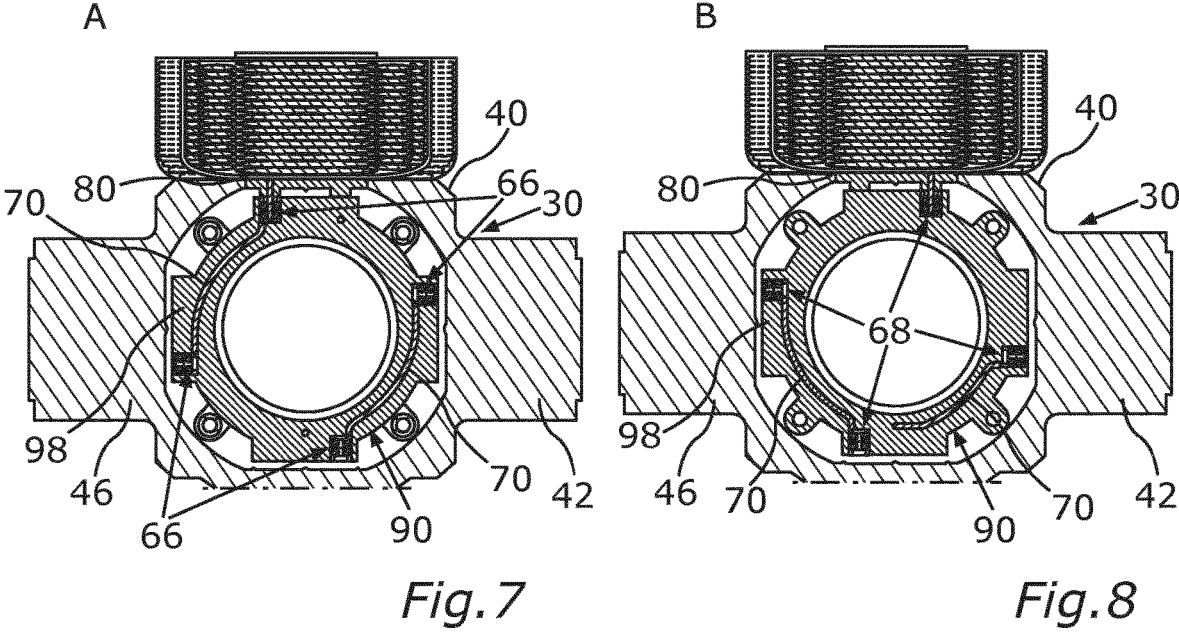
FIG. 7 shows a sectional representation according to the sectional plane A in FIG. 6.
FIG. 8 shows another sectional representation according to the sectional plane B in FIG. 6.

FIG. 7 and FIG. 8 each show sectional views of the contact device 90, wherein FIG. 7 shows a section along a sectional plane A and FIG. 8 shows a section along another sectional plane B. The sectional planes A and B are oriented parallel to each other and have an offset relative to each other in the axial extent direction x.

As already described, the respective plug-in connections 66, 68 for each of the winding devices 50 also have this offset. Since the rotor 20 in the present case has four pole cores 40, 42, 44, 46 and four winding devices 50 attached thereto, for each winding 60 of the respective winding device 50 four of the plug-in connections 66 lie in the sectional plane A for the four first winding wire ends 62 and for the four second winding wire ends 64 four of the plug-in connections 68 lie in the sectional plane B. The present total of eight plug-in connections 66, 68 are conductively connected to one another via multiple conductor elements 70, which partially extend over both sectional planes A and B and thus through the contact ring element 98 with the offset in the axial extent direction x, in such a way that a power supply to the four windings 60 or winding devices 50 can take place via the contacts 100, 102, as can be seen by examining FIG. 7 and FIG. 8 with FIG. 5. For this purpose, a respective contact 100, 102 is connected to a respective one of the total of eight plug-in connections 66, 68 and the eight plug-in connections 66, 68 are conductively connected to each other via the mentioned conductor elements 70.

REFERENCE SIGN LIST

10 electric machine
12 stator
20 rotor
30 rotor base body
40 pole core
42 pole core
44 pole core
46 pole core
50 winding device
60 winding
62 first winding wire end
64 second winding wire end
66 plug-in connection
68 plug-in connection
70 conductor element
80 alignment element
82 through opening
84 through opening
90 contact device
91 end face
92 spring element
94 spring element
96 sheath element
98 contact ring element
100 contacts
102 contacts
K motor vehicle
O orientation
R radial extent direction
X axial extent direction

What is claimed is:

1. A rotor for an electric machine, the rotor comprising:
a rotor body which has at least one pole core,
at least one winding device which is mounted on the at least one pole core, and
at least one contact device which is non-rotatably connected to a rotor base body and is conductively coupled to the at least one winding device, wherein:

the at least one winding device contains at least one winding which is attached to the at least one pole core and has two winding wire ends, of which at least one winding wire end is coupled in a conductive manner via at least one plug-in connection to the at least one contact device, and
the at least one contact device contains at least one spring element, by way of which the at least one winding wire end is coupled to the at least one contact device with formation of the plug-in connection.

2. The rotor according to claim 1, wherein:
the at least one winding is in a form of a prefabricated winding.

3. The rotor according to claim 1, wherein:
the at least one winding device has at least one alignment element which keeps at least one of the winding wire ends oriented in a predetermined orientation.

4. The rotor according to claim 3, wherein:
the at least one alignment element has at least one through opening through which the at least one winding wire end is passed and kept oriented in the orientation.

5. The rotor according to claim 3, wherein:
the at least one winding wire end is joined to the at least one alignment element.

6. The rotor according to claim 1, further comprising:
at least one pole shoe which is connected to the at least one pole core and which prevents a centrifugal detachment of the at least one winding device from the at least one pole core while the rotor is being used.

7. A method for producing the rotor according to claim 1, the method comprising:
a) attaching at least one winding device to the at least one pole core; and
b) coupling the at least one winding of the at least one winding device to the at least one contact device by coupling the at least one winding wire end to the at least one contact device by way of the at least one plug-in connection.

8. The method according to claim 7, wherein:
the coupling according to b) is carried during of the attaching according to step a).

9. The method according to claim 7, wherein:
the coupling according to b) is carried out as a result of the attaching according to step a).

10. An electric machine for a motor vehicle, the electric machine comprising at least one rotor according to claim 1.

* * * * *